(No Model.) 2 Sheets—Sheet 1.
A. G. WILKINS.
LAWN MOWER.
No. 405,753. Patented June 25, 1889.
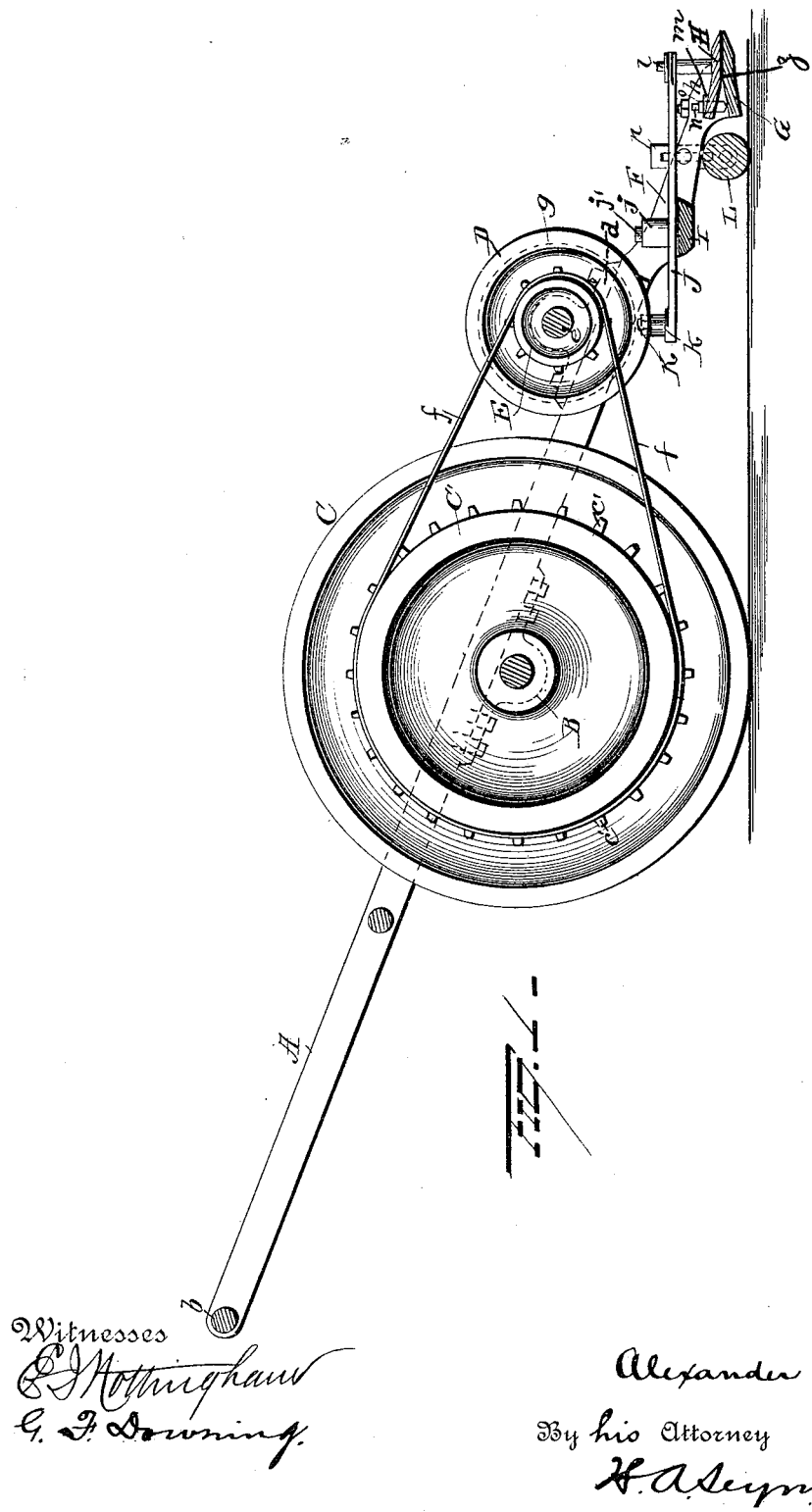
Witnesses
E. J. Nottingham
G. F. Downing
Inventor
Alexander G. Wilkins
By his Attorney
H. A. Seymour

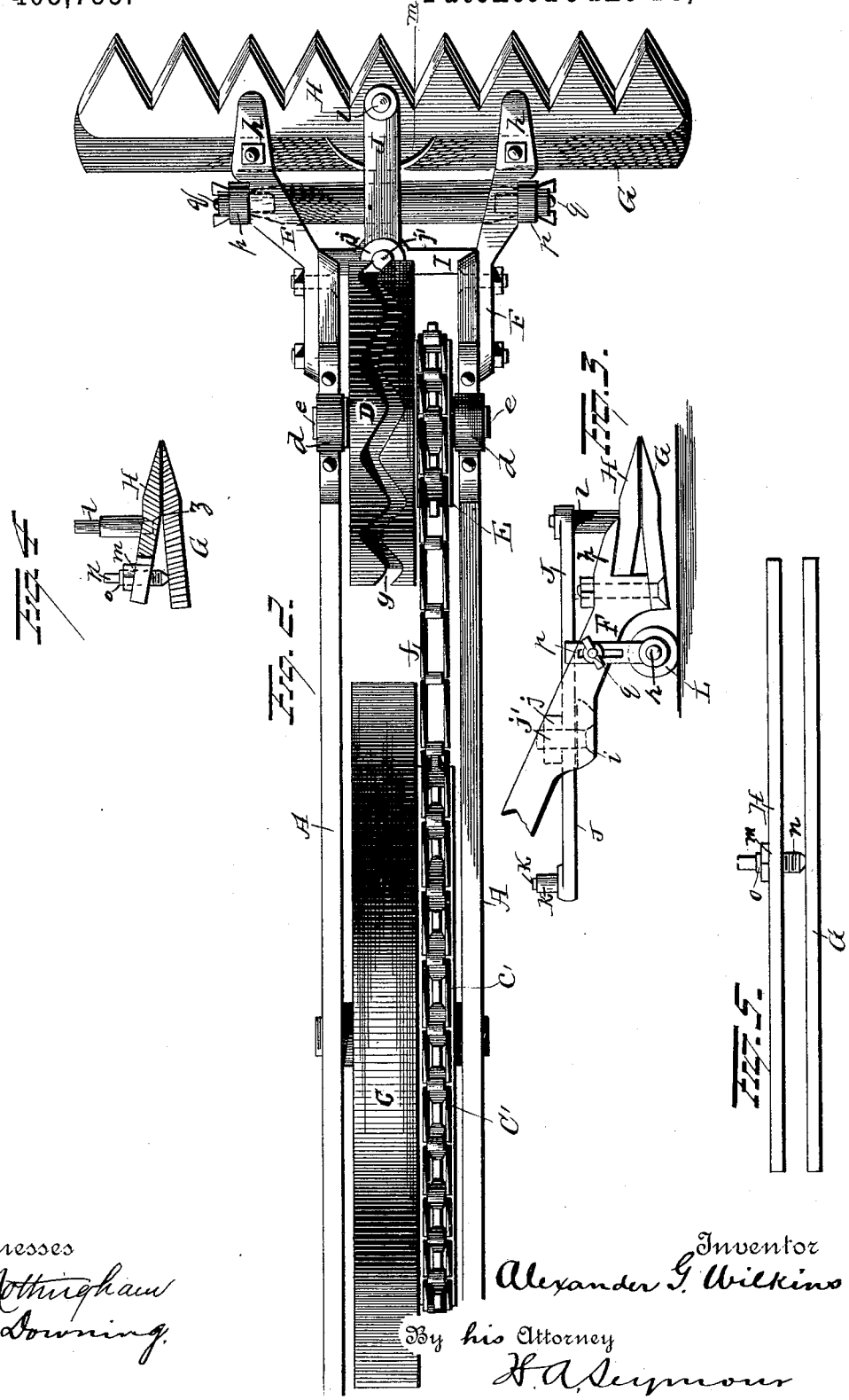

UNITED STATES PATENT OFFICE.

ALEXANDER G. WILKINS, OF MEADVILLE, PENNSYLVANIA.

LAWN-MOWER.

SPECIFICATION forming part of Letters Patent No. 405,753, dated June 25, 1889.

Application filed August 17, 1888. Serial No. 283,003. (No model.)

*To all whom it may concern:*

Be it known that I, ALEXANDER G. WILKINS, of Meadville, in the county of Crawford, and State of Pennsylvania, have invented certain new and useful Improvements in Lawn-Mowers; and I do hereby declare the following to be a full, clear, and exact description of the invention, such as will enable others skilled in the art to which it appertains to make and use the same.

My invention relates to an improvement in lawn-mowers, and has for its object to produce a lawn-mower by means of which grass may be mowed the full width of the machine.

A further object is to provide a mower by means of which long as well as short grass may be cut with equal readiness.

A further object is to so construct the machine that it may be made to mow the grass close to mounds, shrubbery, and under fences, and dispense entirely with the use of a sickle.

A further object is to produce a lawn-mower which shall be simple and cheap in construction, as well as light-running and effective in operation.

With these objects in view my invention consists in certain novel features of construction and peculiar combinations and arrangements of parts, as will be hereinafter set forth, and pointed out in the claims.

In the accompanying drawings, Figure 1 is a side view of my improved mower. Fig. 2 is a top plan view of the same. Fig. 3 is a side elevation of the forward end of the machine. Figs. 4 and 5 are views illustrating certain details.

A A represent two side plates, held together at a suitable distance apart in any preferred manner, and constituting a frame in which the operating mechanism is mounted. The inner or upper ends of the side plate will preferably be connected by a bar $b$, that acts as a handle by which to manipulate the device, as hereinafter described.

Journaled in brackets B, secured to the bars or plates A at or near their center, is a drum or ground-wheel C. This ground-wheel will advisably be cut away at one side, Fig. 2, and provided with sprocket-teeth $c'$, to produce a sprocket-wheel C'; or, if desired, the wheel C and sprocket-wheel C' may be made separately and keyed together in any suitable manner.

Brackets $d$ are secured to the top of the side bars A in front of wheel C, and serve as bearings for the journals $e$ of a drum D and sprocket-wheel E, the latter being made integral with the drum D, or keyed thereto as, desired. The sprocket-wheels C' and E are now connected by a sprocket chain or belt $f$, and as the wheel C' is much larger than the wheel E, a rotation of the former at a certain rate of speed will cause the latter to rotate at a greater speed, this construction being for a purpose which will appear farther on. The drum D is furnished on its periphery with a cam-groove $g$, for a purpose presently explained.

Bolted or otherwise secured to the lower ends of the side bars A are two forwardly-extending arms F, which, beyond their attachment to the bars A, are advisably bent outwardly slightly and bolted to a fixed cutter-bar G at points removed somewhat from the ends thereof, said cutter-bar being disposed at right angles to the bars A, as shown in Figs. 1 and 2. The free extremities of the arms F are cut away in their under side to produce forwardly and downwardly extending lips or projections $h$, which serve to retain and guide a reciprocating cutter-bar H, loosely mounted upon the stationary cutter-bar G.

Secured between the arms F somewhat beyond the side bars A is a cross-bar I, having a perforation $i$ at its center, as shown in Fig. 3. A rod or lever J, having a perforated boss $j$ at a point between its ends, is placed upon the cross-bar I so that the perforation of the boss will be coincident with the perforation in the cross-bar. Said cross-bar I and lever J are now pivotally connected together by means of a pivot-pin $j'$, as shown most clearly in Fig. 3, said pin being secured at its lower end to the cross-bar I and preferably projecting at its upper end above the boss $j$ of lever J.

The inner end of the lever J is furnished with a pin K, extending upwardly at right angles thereto, and has journaled on its upper end an anti-friction roller $k$, adapted to run in the cam-groove $g$ of the drum D when the latter is rotated. The forward end of the lever J is furnished with a perforation for the reception of an upwardly-projecting pin $l$, secured to the cutter-bar H at the center of the latter. Thus it will be seen that as the machine is pushed along upon the drum C, the drum D will be caused to rotate through the medium of the sprocket-gearing hereinbefore described. As the drum D revolves (at a greater rate of speed than the drum C) the roller $k$ will run through the cam groove $g$ in the periphery of said drum D and cause the lever J to vibrate rapidly on its pivotal bearing on cross-bar I, and as the lever is pivotally connected to the cutter-bar H a rapid reciprocating motion will be imparted thereto. Thus the cutting action between the toothed cutter-bar G and toothed bar H is produced. By permitting the cutting mechanism to project beyond the sides of the frame-work of the machine, the same may be run close to shrubbery, &c., without contact therewith.

To cause the bearing to be on the teeth and afford clearance in the rear to prevent sticking or wedging of the grass or other matter, the rear edge of the rigid cutter-bar G will be bent slightly downwardly and the rear edge of the reciprocating bar H will be bent slightly upwardly. A lug $m$, having a screw-threaded perforation, is provided on the rear edge of the reciprocating bar H for the reception of a similarly-threaded pin $n$, which passes through said lug, and preferably has a cone-shaped lower end to bear upon the upper surface of the rigid cutter-bar G. The pin $n$ is provided with a nut $o$, by which any desired adjustment may be secured.

When it is desired to adjust the cutter-bars, such adjustment may be effected by screwing the screw $n$ more or less through the perforation in the lug $m$, the fulcrum of the reciprocating cutter-bar H on the rigid cutter-bar G being at the point $z$. Such adjustment is permitted by the lever J, as the pivotal connection of said lever with the cross-bar I is made loose to permit a slight vibration of the lever at right angles to its pivot-pin $j'$.

It is advisable that the forward end of the machine be supported upon a roller, which may be so adjusted as to maintain the cutting parts elevated at different distances from the ground.

Brackets $p$, having elongated slots, are attached to the outer faces of the arms F by means of bolts $q$, by which the brackets may be secured at any desired adjustment within the limit of the slots. The lower ends of the brackets $p$ are furnished with perforations adapted to serve as bearings for the journals $r$ of a roller L. This roller is preferably made of hard wood and conical at its ends, while the journals $r$ are advisably metal pieces driven into the ends of the roller.

It is evident that slight changes might be made in the constructive details of my invention without departing from the spirit thereof; hence I do not wish to limit myself to the precise details of construction herein set forth, and pointed out in the claims.

Having fully described my invention, what I claim as new, and desire to secure by Letters Patent, is—

1. In a mowing-machine, the combination, with a frame, a ground-wheel mounted therein, and a cam-grooved drum located in front of the ground-wheel and geared therewith, of arms extending forwardly from the frame and provided with downwardly and forwardly projecting lips, a fixed cutter-bar secured to said arms under said lips, a reciprocating cutter-bar working on said fixed bar, the rear edge of which rests under and in contact with the downwardly and forwardly projecting lips, and a vibrating lever for moving the reciprocating cutter, substantially as set forth.

2. In a mowing-machine, the combination, with a frame, a ground-wheel, and a drum having a cam-groove therein mounted in said frame, of arms having forwardly and downwardly projecting lips, a rigid cutter secured to said arms, a reciprocating cutter supported on the fixed cutter with the upper surface of its rear edge in contact with the downwardly and forwardly projecting lips, and a screw adjustably secured to the rear edge of the reciprocating cutter and bearing against the rear edge of the fixed cutter, substantially as set forth.

3. In a mowing-machine, the combination, with a frame and cutter-driving mechanism, of a fixed cutter-bar secured to the frame, a reciprocating cutter-bar mounted on the rigid cutter-bar and connected with the driving mechanism, a lug on the reciprocating bar and having a screw-threaded perforation, a screw passing through said perforation and bearing on the rigid cutter-bar, and a nut on said screw, substantially as set forth.

4. In a mowing-machine, the combination, with a frame and cutter-driving mechanism, of a fixed cutter-bar secured to the frame and having its rear edge bent downwardly, a reciprocating cutter-bar mounted on the rigid cutter-bar and connecting with the driving mechanism, said reciprocating cutter-bar being bent upwardly at its rear edge, and an adjusting-screw passing through the rear edge of the reciprocating bar and bearing on the rear edge of the rigid cutter-bar, substantially as set forth.

In testimony whereof I have signed this specification in the presence of two subscribing witnesses.

ALEXANDER G. WILKINS.

Witnesses:
 CHAS. PHILLIPS,
 E. M. PHILLIPS.